United States Patent [19]

Shifflett

[11] 4,272,258

[45] Jun. 9, 1981

[54] MUD DEGASSER METHOD AND APPARATUS

[76] Inventor: Wiley M. Shifflett, P.O. Box 133, Mentone, Tex. 79754

[21] Appl. No.: 97,407

[22] Filed: Nov. 26, 1979

[51] Int. Cl.$^3$ ............................................. B01D 19/00
[52] U.S. Cl. ........................................ 55/52; 55/55; 55/184; 55/186; 55/191; 55/203; 55/348; 55/456
[58] Field of Search ...................... 55/52, 55, 184–187, 55/189–193, 202, 203, 322, 323, 337, 348, 452, 456

[56] References Cited

U.S. PATENT DOCUMENTS

| | | | |
|---|---|---|---|
| 1,999,147 | 4/1935 | Ambrose et al. | 55/55 X |
| 2,070,453 | 2/1937 | Rodman | 55/193 X |
| 3,201,919 | 8/1965 | Long | 55/191 X |
| 3,229,449 | 1/1966 | Hogue | 55/193 |
| 3,271,929 | 9/1966 | Bowden et al. | 55/203 X |
| 3,325,974 | 6/1967 | Griffin et al. | 55/193 X |
| 3,831,352 | 8/1974 | Parcels | 55/193 |
| 3,856,483 | 12/1974 | Rumpf et al. | 55/203 X |
| 4,199,332 | 4/1980 | Krohn et al. | 55/191 |

Primary Examiner—Robert H. Spitzer
Attorney, Agent, or Firm—Marcus L. Bates

[57] ABSTRACT

Method and apparatus for degassing mud. The mud, which has been returned from a borehole, is forced to flow upwardly through a main cylindrical housing by the action of an auger device. The auger flight is spaced from the auger shaft, so that a longitudinally extending, axial passageway is formed within the housing for removal of gases from the mud. The auger flight is comprised of a plurality of sections, each axially spaced from one another, with a perforated member being interposed therebetween. The combined action of the flight and the perforated member causes the mud to assume a flow path which releases an unexpected amount of gas therefrom. An annular trough at the top of the housing collects the degasified mud. A closure member at the upper end of the housing enables the axial passageway to be evacuated which enhances the removal of gases from the mud.

12 Claims, 6 Drawing Figures

U.S. Patent  Jun. 9, 1981  Sheet 1 of 2  4,272,258
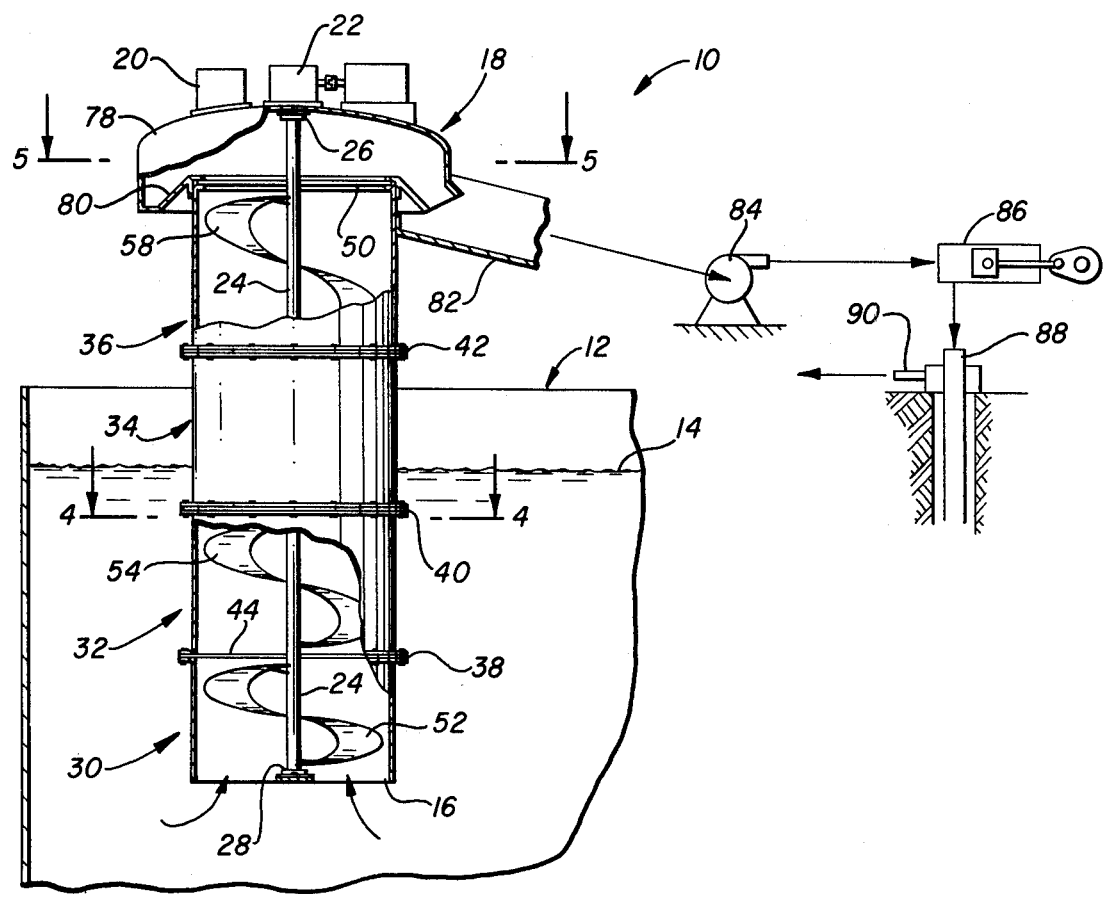
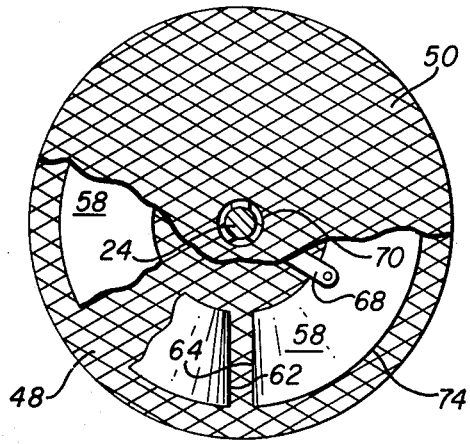
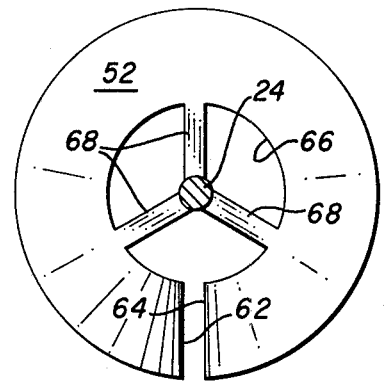

MUD DEGASSER METHOD AND APPARATUS

BACKGROUND OF THE INVENTION

In the borehole formation art, it is necessary to utilize drilling mud in order to circulate cuttings from the drill bit back up the borehole annulus to the surface of the ground. Drilling mud is a mixture of water and bulk materials, such as clays, along with various other chemicals added to the mixture to modify the characteristics of the mud. As the borehole penetrates deeper into the earth, pockets of gas are often encountered, whereupon the gas becomes entrapped within the drilling mud. This reduces the apparent or effective specific gravity of the mud and therefore, it is desirable to be able to treat the drilling mud in a manner to remove as much of the gases from the mud as possible before the mud is returned to the borehole. Otherwise, the mud may not effect the necessary hydrostatic head or pressure on the borehole wall to prevent a well blowout from occurring. A well blowout is considered catastrophic in the art of wellbore formation.

Method and apparatus which removes entrapped compressible fluids from drilling mud is the subject of the present invention.

SUMMARY OF THE INVENTION

Method and apparatus for removing compressible fluids from drilling mud. The apparatus comprises a main cylindrical housing having an inlet formed at the bottom thereof into which gasified mud can flow, and an outlet at the other end thereof from which degassed mud can flow. An auger is rotatably supported within the housing and includes a main shaft aligned along the longitudinal axial centerline of the main housing. An angular flight is attached to the shaft in spaced relationship therewith, thereby providing an axial passageway which extends longitudinally through the main housing. The flight is comprised of a plurality of spaced members having adjacent edge portions which form a slot. When the auger is rotated, the slot describes an annulus which lies perpendicular to the shaft.

A preforated member, preferably in the form of a screen, is interposed between the flight members and is received within the slot so that the perforated member lies perpendicular to the auger shaft.

The auger forces mud to flow through the main housing, where the mud is forced through each of the perforated members; and, at the same time, the rotating action of the auger provides a centrifugal action which forces the mud to flow radially outwardly against the wall of the main housing. This action causes the mud to assume a conical configuration having an apex located near the lower end of the axial passageway, and the sides which outwardly slope in an upward direction, so that released gases can flow towards the axial passageway which extends through the cone.

An annular trough is positioned at the outlet end of the main housing for receiving degasified mud. A closure member isolates the trough from ambient so that the outlet end of the mud degasser can be evacuated to enhance removal of gas from the mud.

Accordingly, a primary object of the present invention is the provision of a new method of removing gas from drilling mud by centrifugally forcing gasified mud to move against the sides of a cylindrical housing and concurrently up through a plurality of perforated members by the employment of an auger action intermediate each of the perforated members.

Another object of the present invention is the provision of a mud degasser having a first auger section which forces mud to flow in an upwardly and outwardly direction with a centrifugal action, whereupon the mud is forced to pass through a first perforated member, and thereafter, the mud is again forced to flow in an upwardly and outwardly direction with a centrifugal action and through another perforated member, while at the same time, a conical void is formed axially through the upwardly flowing mud so that entrained gases released from the mud can flow into the void.

A still further object of the present invention is the provision of a vertically disposed housing having a plurality of spaced apart augers therewithin which forces mud to flow upwardly and outwardly respective to each of the sections of the housing, thereby causing the mud to describe a cone into which released gases may flow.

These and various other objects and advantages of the invention will become readily apparent to those skilled in the art upon reading the following detailed description and claims and by referring to the accompanying drawings.

The above objects of the present invention are attained by the provision of a vertically disposed mud degasser housing having a plurality of spaced apart auger flights affixed to a common shaft, with there being a perforated member interposed between adjacent auger flights, and wherein the auger flights are spaced from the auger shaft, so that mud is forced to flow upwardly and radially away from the axially aligned shaft while gas is removed therefrom and flows along the axial passageway.

BRIEF DESCRIPTION OF THE DRAWINGS

FIG. 1 is a fragmentary, side elevational view of a mud degasser, made in accordance with the present invention, with some parts being broken away therefrom, and some of the remaining parts being shown in cross-section, and shown in conjunction with a flow sheet which describes the method of the present invention;

FIG. 5 is a cross-sectional view taken along line 5—5 of FIG. 1; and,

FIG. 6 is a top, plan view of part of the apparatus disclosed in FIG. 1.

DETAILED DESCRIPTION OF THE PREFERRED EMBODIMENT

Figure 2:
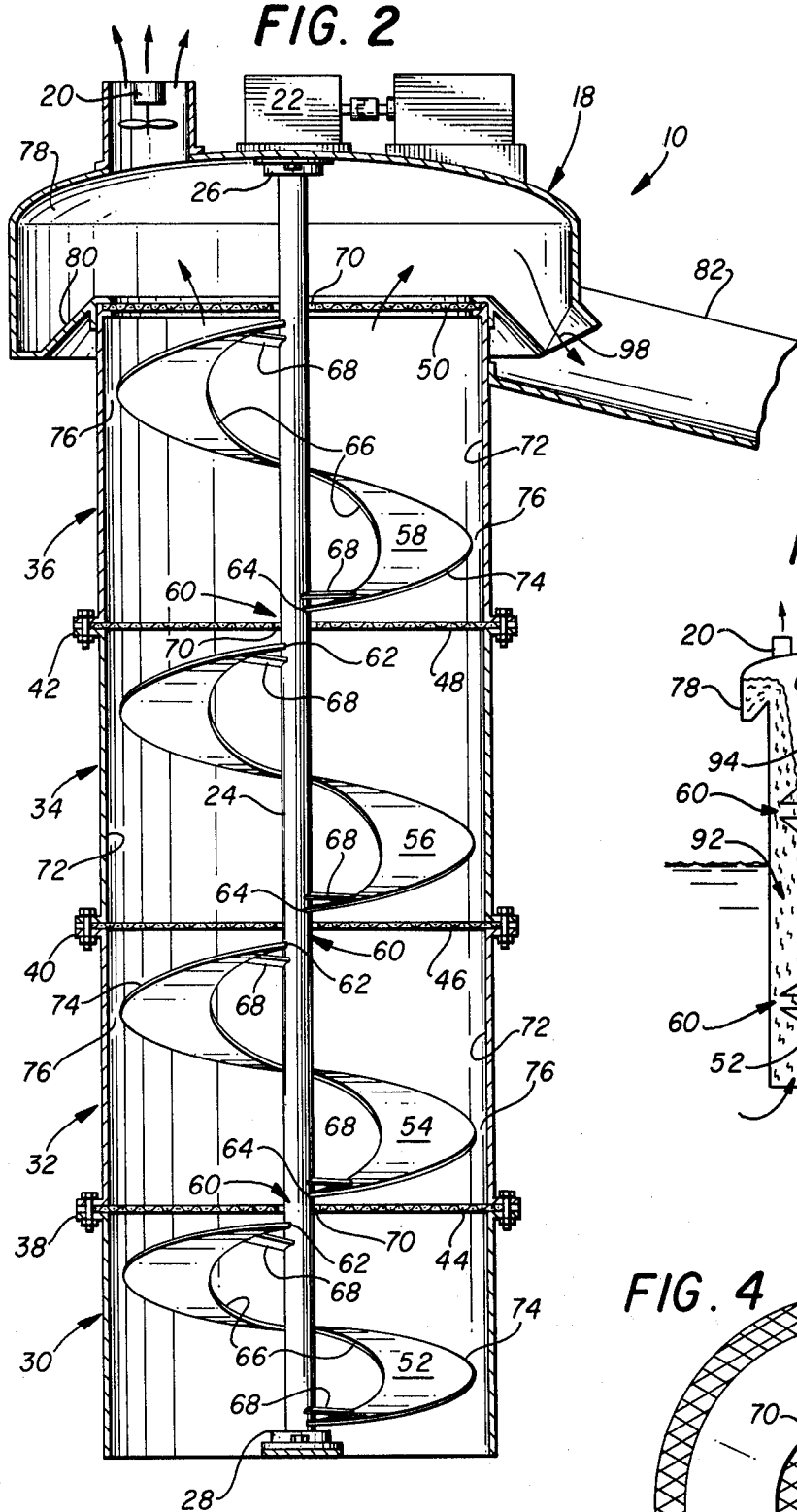
FIG. 2 is a longitudinal, cross-sectional view of part of the apparatus disclosed in FIG. 1.

In FIG. 1, together with other figures of the drawings, there is disclosed a mud gas separator 10 made in accordance with the present invention. The separator is vertically oriented respective to a mud tank 12. Mud level 14 is maintained above the inlet end 16 or bottom of the separator. A dome 18 forms the top or upper end of the separator.

Exhaust fan 20, which can take on several different forms, exhausts compressible gases from the interior of the dome. Gear box 22 drives an axially oriented shaft 24 by means of the illustrated motor. The opposed ends of the shaft is journaled at 26 and 28 by any suitable bearing means.

The main housing of the separator comprises a lower section 30, and adjacent sections 32, 34, and 36; with section 36 being the uppermost section. The sections preferably are removably connected together by means of the bolt flanges 38, 40, and 42.

As best seen in FIG. 2, together with the other figures of the drawings, perforated plates in the form of screens 44, 46, 48, and 50 are captured between the bolt flanges so that the screens are disposed horizontally in spaced parallel relationship to one another.

A plurality of auger flights 52, 54, 56, and 58 are concentrically arranged respective to one another and connected to shaft 24 in spaced relationship therewith. The adjacent ends of each auger are spaced apart to provide a gap therebetween. As best seen illustrated in FIG. 2, the gap 60 is formed between adjacent edges 62 and 64 of auger flights 52 and 54.

The inside peripheral edge portion 66 of the auger flight is spaced from the main shaft 24, thereby providing an axial passageway through the main housing.

Figure 4:
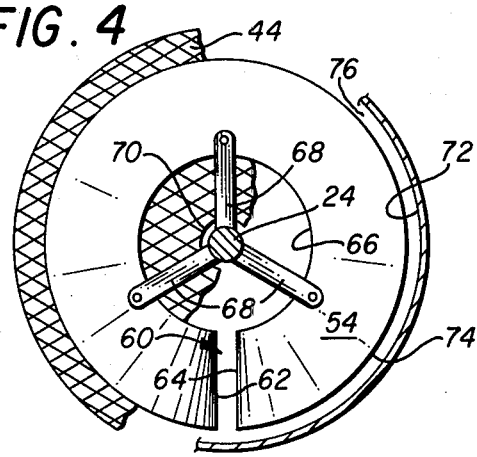
FIG. 4 is a cross-sectional view taken along line 4—4 of FIG. 1.

As seen illustrated in FIGS. 4-6, the flights are mounted to the shaft by means of radial mount arms 68. The arms may be in the configuration of a propeller blade, it deemed desirable, so as to impart upward thrust to any material passing therethrough.

Each of the screens are apertured at 70 to provide a passageway for rotatably receiving the main shaft 24 therethrough. The perforations or screen mesh preferably have 1×1.5 inch openings, and are available as standard expanded metal.

The outer edge portion 72 of each of the screens extend beyond the outer edge 74 of the auger flight so that the marginal circumferentially extending edge of the screen can be received between the abutting bolt flanges which connect the individual sections of the housing to one another. The outer peripheral edge portion 74 of the auger is spaced from the inner peripheral wall surface 72 of the housing to provide annulus 76 therebetween. The annulus is maintained very small, as for example one inch for an auger of 26" diameter placed in a housing of 28" diameter, and having an axial passageway 12" in diameter formed about a 2" diameter shaft.

Figure 3:
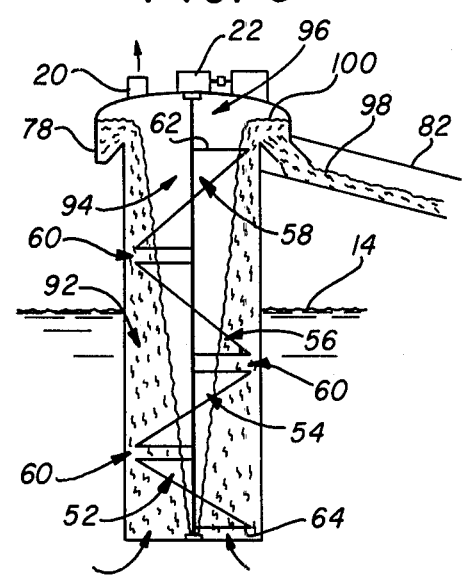
FIG. 3 is a diagrammatical representation of a degasser apparatus by which the method of the present invention is carried out.

A seen in FIGS. 1-3, an annular trough 78 is supported by the upper edge portion of the main housing. The trough includes sloped wall 80 which downwardly slopes away from the upper edge of the main housing so that mud can overflow any marginal edge portion of the housing, flow down the wall 80, and gravitate through the outlet and into the outlet chute 82. From the outlet chute degassed mud is moved by pump 84, sometimes called a supercharger. Main mud pump 86 moves the mud into the drill string 88, forcing the mud to flow downhole to the drill bit and back up the borehole annulus. The gas-cut mud returns from the borehole at 90 and flows into the mud tank 12, where the mud is subsequently treated by the present invention.

As best seen illustrated in FIG. 3, during operation of the apparatus the mud 92 is formed into configuration which defines an evacuated cone 94. The cone results from the mud being forced to flow upwardly and centrifugally outwardly by action of the auger. An evacuated space 96 therefore is defined by the mud 92, cone 94, and dome 18. Numeral 100 indicates the maximum height of the mud during operation of the present process.

In operation, the inlet end of the main housing is submerged below mud level 14, thereby subjecting the lower marginal end of the apparatus to a hydrostatic head. The illustrated motor is energized to rotate shaft 24. This action causes the auger flights to engage and move the mud axially through the main housing, with the mud defining the illustrated cone 94. The mud travels upwardly and outwardly until it contacts the first screen. The cooperative action of the auger flight and screen exposes a large surface area of the mud to the cone, and causes trapped gases to migrate inwardly towards the cone due to the pressure gradient that the centrifugal action of the mud effects, together with a large surface area of the mud being exposed to the mud cone. The gas ladened mud continually moves about due to the stirring action of the flights and due to the passage of the mud through the individual screens.

The pitch of the flight of each section increases in an upward direction and accordingly, the length of the individual sections of the housing increases in an upward direction.

In some instances, it is desirable to cause the overflow at 100 to seal the outlet at 98 so that a vacuum applied at 20 provides a great driving force which forces the gases to exit from the mud. This effectively provides an evacuated cone 94 which is isolated from ambient.

I claim:

1. A mud degasser comprising a main cylindrical housing having an inlet formed at the bottom thereof into which gasified mud can flow, and an outlet at the upper end thereof from which degassed mud can flow; a main shaft including means rotatably supporting said shaft along the axial centerline of the main housing; an auger for said shaft, said auger having a flight which commences adjacent the inlet end of the housing and terminates adjacent the outlet end of said housing; said flight having an outer edge adjacent to and spaced from the inner wall of the housing, and an inner edge spaced from the shaft, thereby forming a longitudinally extending passageway along the axial centerline of the housing, means by which said auger flight is affixed in spaced relationship to said shaft;

so that rotation of the shaft causes mud to flow from said inlet to said outlet, while any entrained gases are forced to flow towards the axial passageway formed between the shaft and the inner edge of the flight.

2. The mud degasser of claim 1 wherein said flight is discontinuous, with there being a lower flight and an upper flight, said upper and lower flights have adjacent terminal edges spaced from one another to form a gap therebetween, and a screen means arranged transverse to the axial centerline of the housing and received within the gap, so that mud must flow from one flight, through said screen means, and to the next adjacent flight.

3. The mud degasser of claim 1 and further including means forming an annular trough at the outlet end of the main housing; said trough is circumferentially disposed about said outlet and receives flow therefrom so that the degassed mud can be transferred away from the main housing and to a mud pump.

4. The mud degasser of claim 1 wherein said auger includes a plurality of spaced apart flights, each two adjacent flights have a lateral screen means located therebetween, with there being a terminal end of a flight in close proximity of a screen;

so that mud is moved from one flight, through a screen, and to an adjacent flight; while entrained gas flows from the mud, and radially towards the axial passageway formed centrally of the auger.

5. The mud degasser of claim 1 wherein said flight is discontinuous, with there being a lower flight and an upper flight spaced axially from one another, said upper and lower flights have adjacent terminal edges spaced from one another to form a gap therebetween, and a lateral screen means arranged transverse to the axial centerline of the housing and received within the gap, so that mud must flow from one flight, through said screen, and to the next adjacent flight;

and further including an annular trough at the outlet end of the main housing; said trough being circumferentially disposed about said outlet and receives flow therefrom so that the degassed mud can be transferred to a mud pump and subsequently pumped into a borehole.

6. The mud degasser of claim 5 and further including a gas pump means at the upper end of the auger which subjects the axial passageway to sub-atmospheric pressure.

7. Method of removing compressible fluids from drilling fluid comprising the steps of:

(1) arranging a cylindrical housing with the longitudinal central axis thereof vertically disposed;

(2) supporting an auger flight in spaced relationship respective to an auger shaft; and rotatably supporting the auger shaft along the axial centerline of the housing, thereby leaving a central axial passageway between the shaft and auger flight through which gases can flow within the housing; wherein the auger flight occupies an outer annular passageway within the housing through which mud is forced to flow;

(3) arranging the auger flight of step (2) into a plurality of auger flights and positioning the flights in spaced relationship to one another to leave a space between adjacent flights;

(4) placing a screen means perpendicular to the shaft and between adjacent flights;

(5) flowing gas-ladened mud into the lower end of the housing, up through the outer annular passageway of the housing interior, and out of the upper end of the housing by rotating the auger shaft to cause mud to flow due to the action of the auger flight;

(6) said mud describes an upwardly opening cone which has an apex located adjacent the lower end and along the axial centerline of the housing, so that a pressure gradient is formed transversely across the flowing mud, to cause gases to flow towards the cone.

8. The method of claim 7 and further including the steps of:

(7) arranging an annular trough about the upper peripheral edge of the housing and connecting the annular trough to an outlet means so that degassed mud overflows the upper end of the chamber and falls into the annular trough and then flows by gravity through said outlet means;

(8) arranging a closure means about said trough which isolates the outlet end of the housing from ambient;

(9) evacuating the upper enclosed end of the housing by applying a suction to the area underlying the closure means.

9. The method of claim 8 and further including the steps of:

(10) increasing the pitch of each successive spaced apart auger in an upward direction to thereby cause the lowermost auger flight to be of a small pitch as compared to the uppermost auger flight.

10. The method of claim 9 wherein the housing is supported with the inlet end thereof submerged in the gasified mud, and the outlet means is connected to enable the mud to be pumped downhole in a borehole.

11. Method of removing compressible fluids from drilling mud comprising the steps of:

(1) arranging a housing with the longitudinal central axis thereof vertically disposed;

(2) placing the lower end of the housing into communication with gasified drilling mud;

(3) flowing the gasified drilling mud upwardly through an outer annulus of the housing by supporting an auger flight respective to an auger shaft and arranging the auger shaft along the longitudinal axial centerline of the housing and rotating the shaft so as to impart rotational motion into the auger shaft; (4) forming an axial flow path inwardly of said outer annulus for compressible fluids released by the gasified drilling mud by spacing the inner edge of the flight from the surface of the shaft;

(5) said mud describes an upwardly opening cone which has an apex located adjacent the lower end of the housing and a central axis which coincides with the longitudinal axial centerline of the housing so that a pressure gradient is formed transversely across the flowing drilling mud, and gases therefore migrate towards the axial passageway.

12. The method of claim 11 wherein there are a plurality of auger flights spaced from one another; and, a transverse baffle means is interposed between adjacent auger flights;

so that the baffle means contacts and disrupts the flowing mud to expose the mud surface to the axial passageway.

* * * * *